(12) United States Patent
Zong et al.

(10) Patent No.: US 11,659,221 B2
(45) Date of Patent: May 23, 2023

(54) PROGRAM PRODUCTION METHOD, DEVICE, SYSTEM AND COMPUTER-READABLE MEDIUM

(71) Applicant: XI'AN NOVASTAR TECH CO., LTD., Shaanxi (CN)

(72) Inventors: Jingguo Zong, Shaanxi (CN); Dan Han, Shaanxi (CN); Leilei Li, Shaanxi (CN)

(73) Assignee: XI'AN NOVASTAR TECH CO., LTD., Shaanxi (CN)

( * ) Notice: Subject to any disclaimer, the term of this patent is extended or adjusted under 35 U.S.C. 154(b) by 0 days.

(21) Appl. No.: 16/956,620

(22) PCT Filed: Dec. 29, 2018

(86) PCT No.: PCT/CN2018/125466
§ 371 (c)(1),
(2) Date: Jun. 22, 2020

(87) PCT Pub. No.: WO2020/098116
PCT Pub. Date: May 22, 2020

(65) Prior Publication Data
US 2021/0266624 A1 Aug. 26, 2021

(30) Foreign Application Priority Data
Nov. 13, 2018 (WO) ................ PCT/CN2018/115187

(51) Int. Cl.
H04N 21/262 (2011.01)
H04N 21/414 (2011.01)
H04N 21/258 (2011.01)

(52) U.S. Cl.
CPC . *H04N 21/26258* (2013.01); *H04N 21/25825* (2013.01); *H04N 21/26241* (2013.01); *H04N 21/41407* (2013.01)

(58) Field of Classification Search
CPC ....... H04N 21/26258; H04N 21/25825; H04N 21/26241; H04N 21/41407
See application file for complete search history.

(56) References Cited

U.S. PATENT DOCUMENTS

2006/0267995 A1 11/2006 Radloff et al.
2007/0050372 A1* 3/2007 Boyle .................... G06Q 30/02
(Continued)

FOREIGN PATENT DOCUMENTS

CN 102176740 A 9/2011
CN 101431651 B 2/2012
(Continued)

OTHER PUBLICATIONS

Search report of corresponding CN application No. 201880080200.9.

*Primary Examiner* — Chris Parry
*Assistant Examiner* — Steven C Nguyen
(74) *Attorney, Agent, or Firm* — Gang Yu

(57) ABSTRACT

At least some embodiments of the present disclosure disclose a program production method, a program production device, a program production system and a computer-readable medium. The program production method includes that: at least one medium is acquired; at least one playlist is generated according to the at least one medium, each of the at least one playlist being associated with the at least one medium; at least one program is generated according to the
(Continued)

at least one playlist, each of the at least one program including a play region and the play region corresponding to the at least one playlist; and the play region is scheduled.

13 Claims, 15 Drawing Sheets

(56) References Cited

U.S. PATENT DOCUMENTS

| | | | | |
|---|---|---|---|---|
| 2007/0130023 | A1* | 6/2007 | Wolinsky | H04H 20/74 |
| | | | | 705/27.1 |
| 2009/0313113 | A1* | 12/2009 | Dye | G06Q 30/02 |
| | | | | 705/14.42 |
| 2010/0306022 | A1* | 12/2010 | Plut | G06Q 30/0256 |
| | | | | 705/14.54 |
| 2011/0078726 | A1* | 3/2011 | Rosenberg | H04N 21/25891 |
| | | | | 725/34 |
| 2012/0057853 | A1* | 3/2012 | Huber | H04N 21/4333 |
| | | | | 386/292 |
| 2012/0284744 | A1* | 11/2012 | Kumar | H04N 21/26258 |
| | | | | 725/34 |
| 2013/0346193 | A1* | 12/2013 | Curtis | H04N 21/4438 |
| | | | | 705/14.49 |
| 2015/0033257 | A1* | 1/2015 | Kulasekaran | H04N 21/458 |
| | | | | 725/34 |
| 2015/0254732 | A1* | 9/2015 | Snyder | G06Q 30/0277 |
| | | | | 705/14.72 |
| 2018/0158102 | A1* | 6/2018 | Choi | H04N 5/63 |
| 2018/0181977 | A1* | 6/2018 | Takei | G06Q 30/0251 |
| 2020/0090216 | A1* | 3/2020 | Gudai | G06Q 30/0277 |

FOREIGN PATENT DOCUMENTS

| | | |
|---|---|---|
| CN | 102568441 A | 7/2012 |
| CN | 103096172 A | 5/2013 |
| CN | 103167321 A | 6/2013 |
| CN | 103400281 A | 11/2013 |
| CN | 103763582 A | 4/2014 |
| CN | 104063196 A | 9/2014 |
| CN | 104093082 A | 10/2014 |
| CN | 104113783 A | 10/2014 |
| CN | 105141992 A | 12/2015 |
| CN | 106303710 A | 1/2017 |
| CN | 106488274 A | 3/2017 |
| CN | 106792197 A | 5/2017 |

* cited by examiner

| | Layout | Program setting | | | | |
|---|---|---|---|---|---|---|
| Screen size | 1024×768 | | | | | |
| Width | 1024 | | | | | |
| Height | 768 | | | | | |
| Layout region | Add more | | | | | |
| Thumbnail | Name | Left | Top | Width | Height |
| ☐ | new1 | 0 | 384 | 512 | 384 |
| ☐ | new2 | 512 | 384 | 512 | 384 |
| ☐ | new3 | 512 | 0 | 512 | 384 |
| ☐ | new1 | 0 | 0 | 512 | 384 |

| new4 | new3 |
|---|---|
| new1 | new2 |

| Repeat | Every day |
| Repeat from date | 2018-06-27 |
| Repeat to date | Permanently valid |

Fig. 17

| Repeat | Every week |

Sunday | Monday | Tuesday | Wednesday | Thursday | Friday | Saturday

Fig. 18

| Repeat | Every month |

On

| 1 | 2 | 3 | 4 | 5 | 6 | 7 | 8 |
| 9 | 10 | 11 | 12 | 13 | 14 | 15 | 16 |
| 17 | 18 | 19 | 20 | 21 | 22 | 23 | 24 |
| 25 | 26 | 27 | 28 | 29 | 30 | 31 |

PROGRAM PRODUCTION METHOD, DEVICE, SYSTEM AND COMPUTER-READABLE MEDIUM

TECHNICAL FIELD

The present disclosure relates to the technical field of display application, and in particular to a program production method, a program production device, a program production system and a computer-readable medium.

BACKGROUND

When a display screen operating company publishes services of advertisers, there may be such a condition that media of multiple advertisers are required to be played at different time period on the same display screen. The display screen operating company may produce a program including the media of the corresponding advertisers, set play time ranges for the media as required by the advertisers and release and play the produced program. However, in this simple program form, one medium may be played at the same time on the whole display screen, which cannot meet complex and diversified program scheduling scenarios. In addition, present program production is required to meet the following constraints.

One, a play time period of each of multiple media is exclusive, that is, the play time period of each of the multiple media may not overlap.

Two, the play time point of each of the multiple media is set to a type of absolute time point, namely the specific year, month, date, hour, minute and second are required to be set.

Three, a medium with a long-time characteristic, for example, a video, is cyclically played in a set time period.

Four, the display screen may be blank in gaps between two different play time periods. For avoiding a phenomenon of blank screen, the continuity of the play time period of the media is required to be manually ensured. Once an original advertiser is no longer required to play the corresponding medium or a new advertiser has a new advertising requirement, the display screen operating company is required to produce a new program for transmission and playing according to a new service requirement and may not make modifications according to the original program to meet the new requirement. Consequently, at the time of increasingly fast changing of play requirements of advertisers, a program production process of the display screen operating company may become complex and time-consuming.

SUMMARY

At least some embodiments of the present disclosure provide a program production method, a program production device, a program production system and a computer-readable medium, so as at least to implement program production for a complex scheduling scenario.

In an optional embodiment of the present disclosure, a program production method is provided, which may include that: at least one medium is acquired; at least one playlist is generated according to the at least one medium, each of the at least one playlist being associated with the at least one medium; at least one program is generated according to the at least one playlist, each of the at least one program including a play region and the play region corresponding to the at least one playlist; and the play region is scheduled.

In an optional embodiment of the present disclosure, each of the at least one medium may include a picture, a video, a streaming medium, a Really Simple Syndication (RSS) medium, a web link or a document.

In an optional embodiment of the present disclosure, the operation that the at least one medium is acquired may include that: the at least one medium is added to a medium list interface in response to a first button operation on the medium list interface; the at least one medium is selected, and a medium attribute setting interface is displayed in response to a second button operation on the medium list interface; and a valid date of the at least one medium is set in response to an input operation on a basic information page of the medium attribute setting interface.

In an optional embodiment of the present disclosure, the operation that the at least one playlist is generated according to the at least one medium, each of the at least one playlist being associated with at least one medium may include that: the at least one playlist is added in response to a first button operation on a playlist list interface, and a playlist attribute setting interface is displayed; and the at least one medium is selected in response to a second button operation on a medium option edition page of the at least one playlist attribute setting interface to associate each of the at least one playlist with the at least one medium.

In an optional embodiment of the present disclosure, after the operation that the at least one medium is selected in response to the second button operation on the medium option edition page of the playlist attribute setting interface to associate each of the at least one playlist with the at least one medium, the method may further include that: a target medium is selected on the at least one medium option edition page, and a medium play attribute setting interface is displayed in a modal dialogue box form in response to a third button operation on the medium option edition page; and a play plan for the at least one medium is set in response to a selection operation on a play plan setting page of the medium play attribute setting interface, the play plan setting page including a valid from date setting, a valid to date setting, a valid time range setting and a valid week setting.

In an optional embodiment of the present disclosure, the operation that the program is generated according to the at least one playlist, the at least one program including the play region may include that: the at least one program is added to a program list interface in response to a first button operation on the program list interface, and a layout type setting interface is displayed in the modal dialogue box form; a layout type of each of the at least one program is set in response to a second button operation on the layout type setting interface to generate the play region, and a program attribute setting interface of each of the at least one program is displayed; and at least one of a screen size parameter for playing the at least one program and a position parameter and size parameter of the play region are set in response to a first input operation on a layout page of the program attribute setting interface.

In an optional embodiment of the present disclosure, the operation that the play region is scheduled may include that: a program setting page is displayed in response to an operation on the program attribute setting interface, the program setting page including a play region selection interface and a schedule timetable interface, the play region selection interface including a graphic region corresponding to the play region; a target graphic region corresponding to a target play region. In the play region is selected, and a first schedule panel is displayed on the schedule timetable interface; a schedule setting interface is displayed in the modal dialogue box form on the first schedule panel in response to a third button operation on the schedule timetable interface;

and a target playlist in the at least one playlist is added in response to a selection operation on a playlist list page of the schedule setting interface, the playlist list page including at least one of a playlist name, a playlist duration, a medium thumbnail and a medium number.

In an optional embodiment of the present disclosure, after the operation that the target playlist in the at least one playlist is added in response to the selection operation on the playlist list page of the schedule setting interface, the method may further include that: a schedule graph corresponding to the target playlist is generated on the first schedule panel; the schedule graph is selected, and a play plan setting page of the schedule setting interface is displayed in response to a fourth button operation on the first schedule panel; and a play plan corresponding to the first schedule is set in response to a second input operation on the play plan setting page of the schedule setting interface, the play plan setting page including a play starting time setting, a play ending time setting and a repetition manner setting and the repetition manner setting including part or all of options of no repetition, yearly repetition, monthly repetition, weekly repetition and daily repetition.

In an optional embodiment of the present disclosure, the program production method may further include that: a target playlist in the at least one playlist is selected on a playlist list interface, and a playlist attribute setting interface is displayed in response to a first button operation on the playlist list interface; and a target medium in the at least one medium is selected on a medium option edition page of the playlist attribute setting interface, and the target medium is deleted in response to a second button operation on the medium option edition page.

In an optional embodiment of the present disclosure, the program production method may further include that: a medium to be added is provided; a target playlist in the at least one playlist is selected on a playlist list interface, and a playlist attribute setting interface is displayed in response to a first button operation on the playlist list interface; and the medium to be added is selected in response to a second button operation on the medium option edition page of the playlist attribute setting interface to associate the medium to be added with the target playlist.

In another optional embodiment of the present disclosure, a program production device is provided, which may include: a medium acquisition component, acquiring at least one medium; a playlist generation component, generating at least one playlist according to the at least one medium, each of the at least one playlist being associated with the at least one medium; a program generation component, generating at least one program according to the at least one playlist, each of the at least one program including a play region and the play region corresponding to the at least one playlist; and a scheduling component, scheduling the play region.

In an optional embodiment of the present disclosure, the playlist generation component may acquire the at least one medium by: adding the at least one medium to a medium list interface in response to a first button operation on the medium list interface; selecting the at least one medium and displaying a medium attribute setting interface in response to a second button operation on the medium list interface; and setting a valid date of the at least one medium in response to an input operation on a basic information page of the medium attribute setting interface.

In an optional embodiment of the present disclosure, the playlist generation component may generate the at least one playlist by: adding the at least one playlist in response to a first button operation on a playlist list interface and displaying a playlist attribute setting interface; and selecting the at least one medium in response to a second button operation on a medium option edition page of the playlist attribute setting interface to associate each of the at least one playlist with the at least one medium.

In another embodiment of the present disclosure, a program production system is provided, which may include a memory and a processor. The memory may store a computer program. The processor may run the computer program to execute any abovementioned program production method.

In another embodiment of the present disclosure, a computer-readable medium with a computer-executable instruction for executing a program production method is provided, the program production method being any abovementioned program production method.

According to the program production method provided in the at least some embodiments of the present disclosure, a nested hierarchical relationship between a medium, a playlist and a program is established, so that a complex program scheduling scenario may be implemented, for example, different media may be played according to different schedules in different play regions on a screen of a display device, to meet diversified requirements of a user.

BRIEF DESCRIPTION OF THE DRAWINGS

In order to describe the technical solutions in the embodiments of the present disclosure more clearly, the drawings required to be used for descriptions about the embodiments will be simply introduced below. It is apparent that the drawings described below are some embodiments of the present disclosure. Those of ordinary skill in the art may further obtain other drawings according to these drawings without creative work.

FIG. 2 is a partial interface diagram of a medium list interface according to an optional embodiment of the present disclosure.

FIG. 3 is a partial interface diagram of a medium attribute setting interface according to an optional embodiment of the present disclosure.

FIG. 4 is a partial interface diagram of a playlist list interface according to an optional embodiment of the present disclosure.

FIG. 7 is a partial interface diagram of a medium option edition page after a target medium is selected according to an optional embodiment of the present disclosure.

FIG. 8 is a partial setting interface diagram of a medium play attribute setting interface according to an optional embodiment of the present disclosure.

FIG. 12 is a partial setting interface diagram of a layout page of a program attribute setting interface according to an optional embodiment of the present disclosure.

FIG. 15 is a partial setting interface diagram of a play plan setting page of a schedule setting interface according to an optional embodiment of the present disclosure.

FIG. 16 is a partial setting interface diagram of an option setting page of a schedule setting interface according to an optional embodiment of the present disclosure.

FIG. 17 is a partial interface diagram when a repetition manner is set to be daily repetition according to an optional embodiment of the present disclosure.

FIG. 18 is an interface diagram when a repetition manner is set to be weekly repetition according to an optional embodiment of the present disclosure.

FIG. 19 is a partial interface diagram when a repetition manner is set to be monthly repetition according to an optional embodiment of the present disclosure.

DETAILED DESCRIPTION

The technical solutions in embodiments of the present disclosure will be clearly and completely described below in combination with the drawings in the embodiments of the present disclosure. It is apparent that the described embodiments are part of the embodiments of the present disclosure but not all of the embodiments. All other embodiments obtained by those of ordinary skill in the art according to the embodiments in the present disclosure without creative work shall fall within the scope of protection of the present disclosure.

Figure 1:
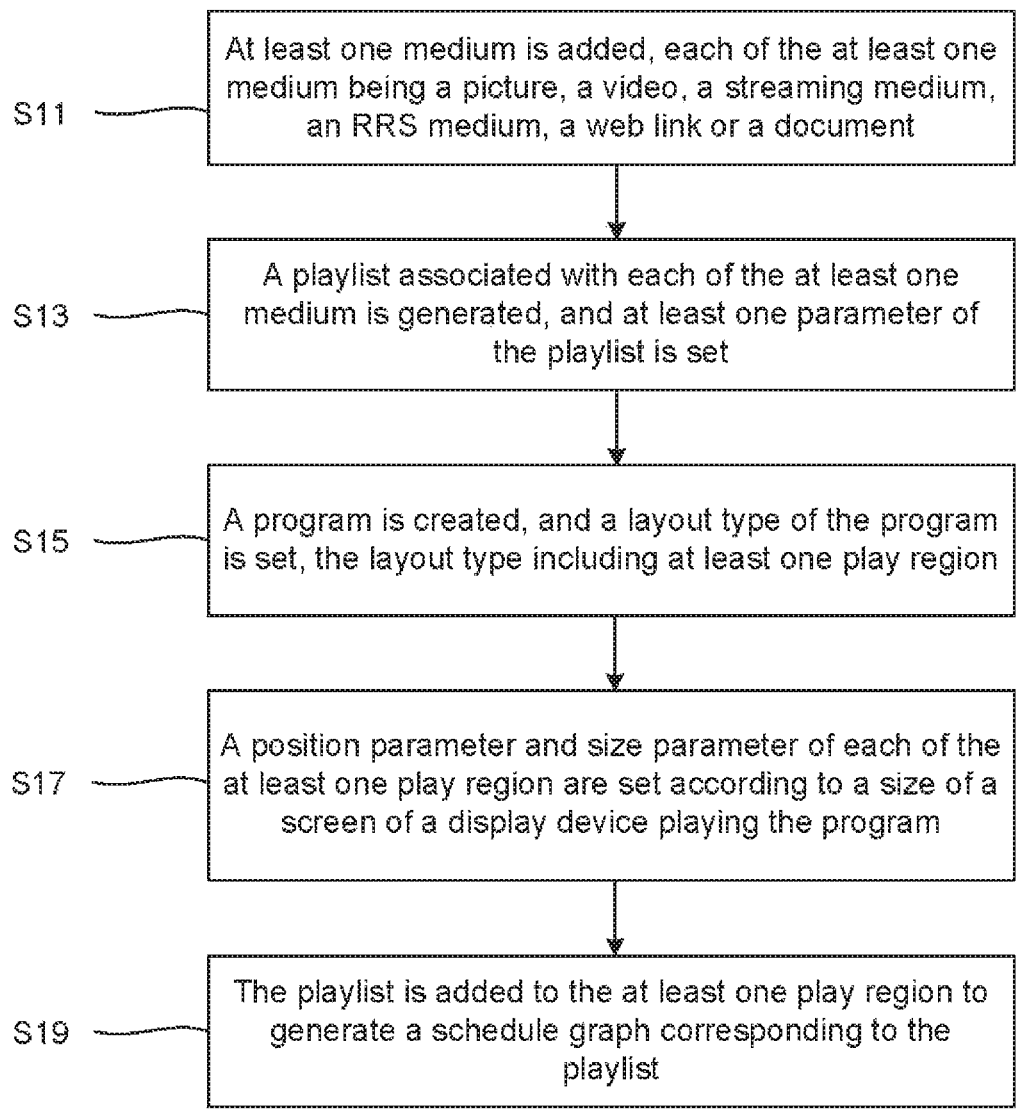
FIG. 1 is a flowchart of a program production method according to an optional embodiment of the present disclosure.
Figure 5:
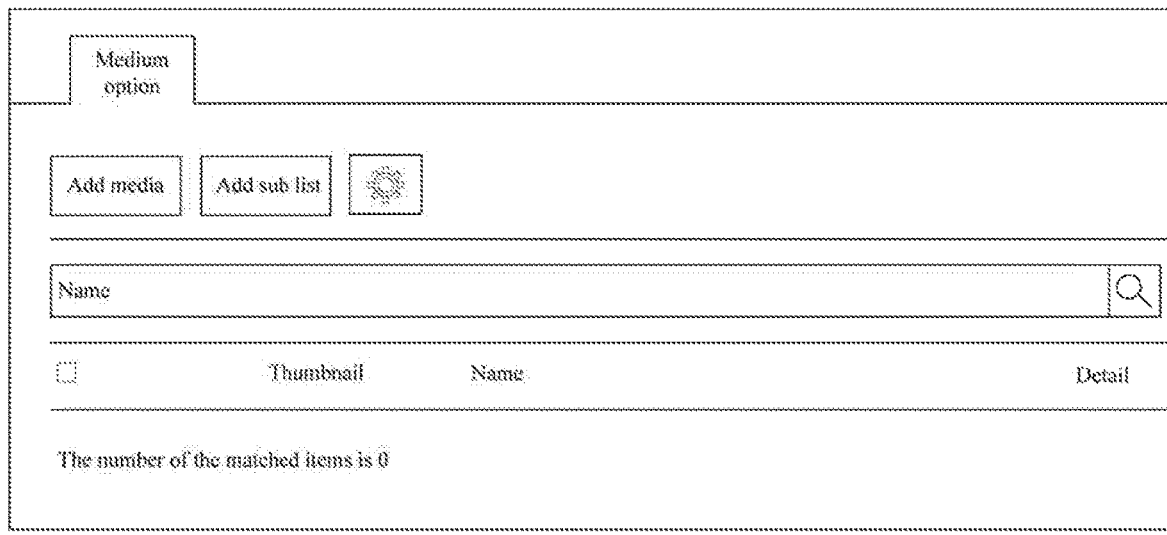
FIG. 5 is a partial interface diagram of a medium option edition page of a playlist attribute setting interface according to an optional embodiment of the present disclosure.
Figure 6:
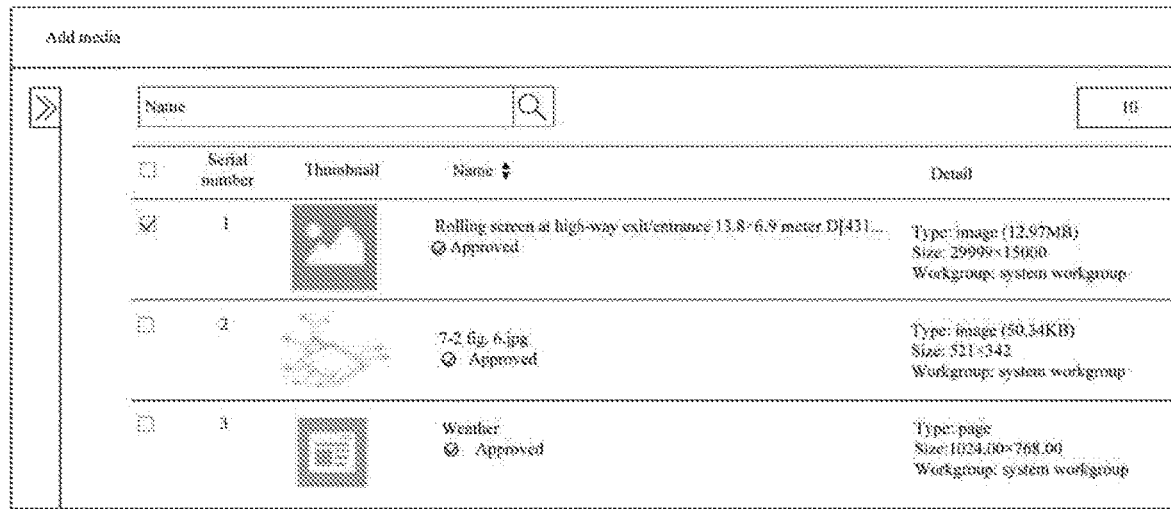
FIG. 6 is a partial interface diagram of a medium addition interface according to an optional embodiment of the present disclosure.

As shown in FIG. 1, an optional embodiment of the present disclosure provides a program production method, which includes the following steps.

As step S11, at least one medium is added, each of the at least one medium being a picture, a video, a streaming medium, an RRS medium, a web link or a document.

As step S13, a playlist associated with each of the at least one medium is generated, and at least one parameter of the playlist is set.

As step S15, a program is created, and a layout type of the program is set, the layout type including at least one play region.

As step S17, a position parameter and size parameter of each of the at least one play region are set according to a size of a screen of a display device playing the program.

As step S19, the playlist is added to the at least one play region to generate a schedule graph corresponding to the playlist.

For conveniently understanding the present disclosure, each step of the program production method of the embodiment will be described below in combination with FIG. 2 to FIG. 21 in detail.

The embodiment of the present disclosure provides a novel program production method based on a VNNOX system. The VNNOX system is configured to produce and manage a program played on a display device such as a Light-Emitting Diode (LED) display screen. Herein, the program is a set of scheduled playlists. The program production method includes, for example, medium addition, association of the medium to a playlist and scheduling of the playlist. A specific implementation manner is as follows.

Figures 2, 3, 4:
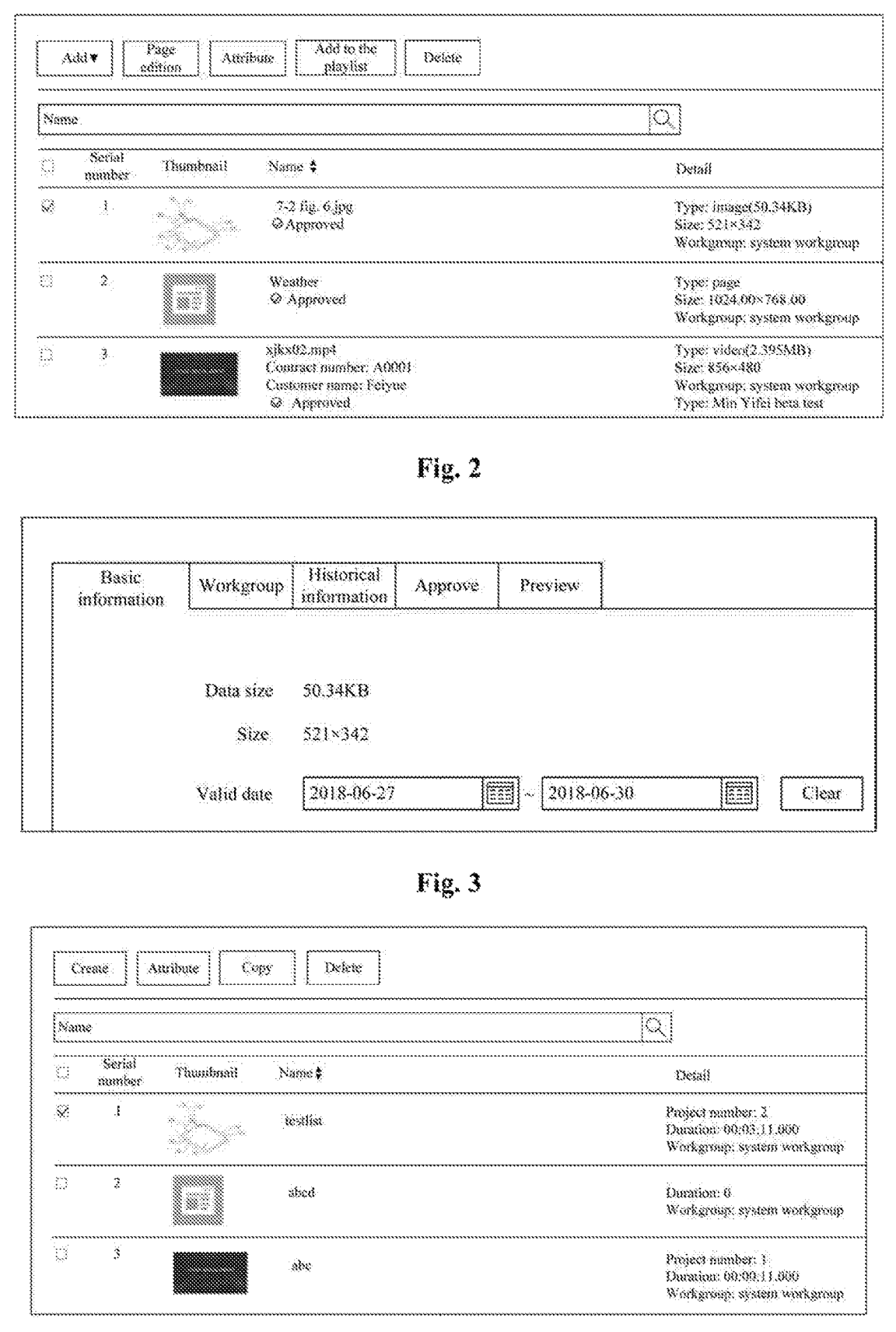

At first, a medium is added. The medium is a minimum unit of a program. The medium includes a picture, a video, a streaming medium, an RRS medium, a web link or a document, etc. As shown in FIG. 2, added media are listed on a medium list interface. A medium required to be played (also called a target medium) is added to the medium list interface on the medium list interface in response to a user operation of, for example, clicking an [add] button in the left upper corner of the medium list interface. The target medium is selected, and a medium attribute setting interface (referring to FIG. 3) is displayed in response to a user operation of, for example, clicking an [attribute] button in the left upper corner of the medium list interface. A basic information page of the medium attribute setting interface is selected. The basic information page includes a valid date setting. A valid date includes "starting time point" and "ending time point". The "starting time point" and "ending time point" of the target medium are set in response to an input operation of a user such as a date input. It is apparent that the "starting time point" is not later than the "ending time point". Therefore, the target medium may be played in a time range from the "starting time point" to the "ending time point". In addition, there may be at least one target media.

Then, a playlist associated with the medium is generated, and at least one parameter of the playlist is set. The playlist includes at least one medium. As shown in FIG. 4, generated playlists are listed on a playlist list interface. A new playlist is added on the playlist list interface in response to a user operation of, for example, clicking a [create] button in the left upper corner of the playlist list interface, and a playlist attribute setting interface is displayed, a medium option edition page (referring to FIG. 5) of the playlist attribute setting interface being displayed by default. The medium option edition page of the playlist attribute setting interface is selected, for example, in response to a user operation, and a medium addition interface (referring to FIG. 6) is displayed in a modal dialogue box form in response to a user operation of, for example, clicking an [add media] button in the left upper corner of the medium option edition page on the medium option edition page. The medium addition interface is a modal dialogue box. The added media are listed on the medium addition interface. A target medium is selected in response to a user operation to associate the target medium to the newly created playlist. When there are multiple target media, the multiple target media may be simultaneously selected to associate the multiple target media to the newly created playlist.

In addition, the target medium is selected on the medium option edition page in response to the user operation, and a medium play attribute setting interface (referring to FIG. 8) is displayed in the modal dialogue box form in response to a user operation of, for example, clicking the [attribute] button (referring to FIG. 7) on the medium option edition page. A play plan setting page of the medium play attribute setting interface is selected in response to a user operation. The play plan setting page includes a valid from date setting, a valid to date setting, a valid time range setting and a valid week setting. The valid from date setting and the valid to date setting are configured to set a valid from date and valid to date of the target medium. The valid from date is a present date by default, and the valid to date is permanently valid by default. A user may modify the valid from date and valid to date of the target medium according to a practical requirement. The valid time range setting is configured to set a play time period of the target medium in a day, and ranges from 00:00 to 24:00. The valid week setting is configured to set a play time period of the target medium in a week, and may be at least one day from Monday to Sunday. Moreover, when the target medium is associated to multiple different playlists, different valid from dates, valid to dates, valid time ranges and valid weeks may be set for the target medium in different playlists. The three attributes, i.e., the valid from date and valid to date, the valid time range and the valid week, in a playlist are in an "and" relationship, and the target medium may be played when the three attributes are simultaneously met.

It is to be noted herein that a priority of the valid date attribute, such as the "starting time point" and the "ending time point" of the target medium in the previous step is higher than a priority of the "valid from date" and "valid to date" of the target medium in the playlist in the present step. That is, when the valid date attribute, such as the "starting time point" and the "ending time point", of the target medium is invalid, no matter whether the "valid from date" and "valid to date" of the target medium are invalid or not, the target medium may not be played in the playlist.

Figure 9A:
FIG. 9a is a partial setting interface diagram of a medium option sequencing page of a playlist attribute setting interface according to an optional embodiment of the present disclosure.
Figure 9B:
FIG. 9b is a partial setting interface diagram of a medium list position setting interface according to an optional embodiment of the present disclosure.

When multiple media are associated with a playlist, a play sequence of the multiple media is the same as an addition sequence of the media by default. It is to be noted herein that the multiple media in the playlist are continuously played. In other words, a blank screen of the display device playing the program in valid time period of the playlist is avoided, so that a great experience is brought to the user. After the playlist is prepared, a play sequence of the multiple media associated with the playlist may also be regulated in response to a user operation. Specifically, as shown in FIG. 9a, the medium of which the play sequence is to be regulated is selected on a medium option sequencing page of the playlist attribute setting interface, and a medium list position setting interface (referring to FIG. 9b) is displayed in the modal dialogue box form in response to a user operation of, for example, clicking the [move] button on the medium option sequencing page on the medium option sequencing page, the medium list position setting interface including a move to list position setting. Then, the play sequence of which the play sequence is to be regulated is set on the medium list position setting interface in response to a user operation of, for example, inputting a target list position of the medium of which the play sequence is to be regulated into the move to list position setting. The target list position of the medium is represented by an Arabic number. For example, when number 1 is input into the list position setting, it is indicated that the play sequence of the medium of which the play sequence is to be regulated in the playlist is the first, and when number 2 is input into the list position setting, it is indicated that the play sequence of the medium of which the play sequence is to be regulated in the playlist is the second.

Figure 10A:
FIG. 10a is a partial setting interface diagram of a program list interface according to an optional embodiment of the present disclosure.
Figure 10B:
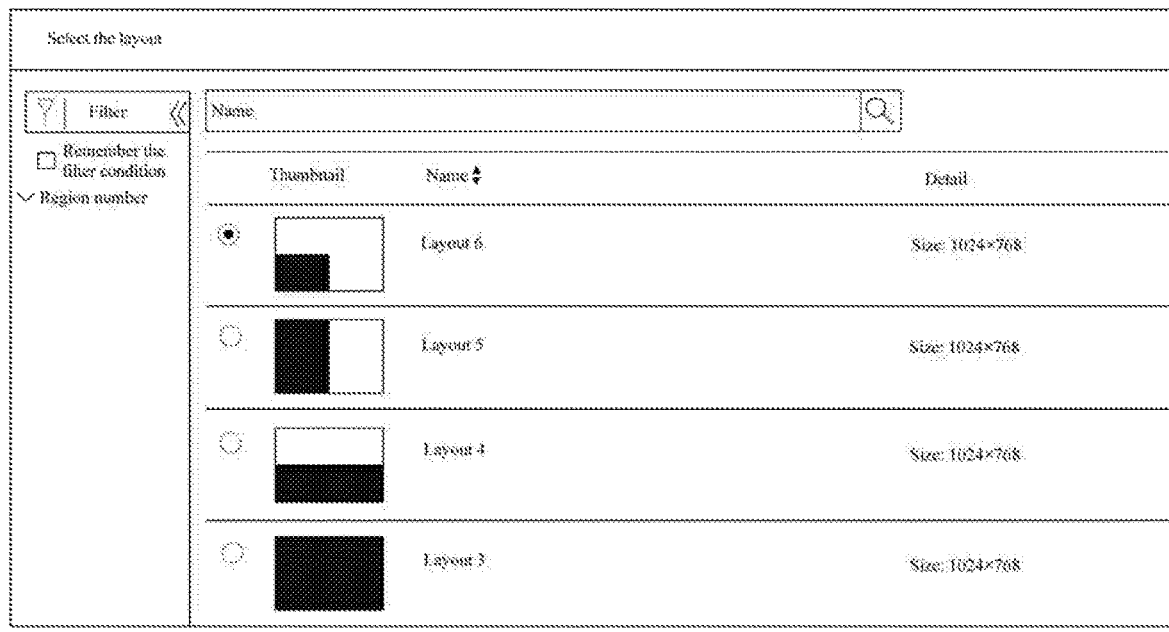
FIG. 10b is a partial setting interface diagram of a layout type setting interface according to an optional embodiment of the present disclosure.

Next, the program is created, and a layout type field of the program is set. The program is created in a program list interface as shown in FIG. 10*a*. Created programs are listed on the program list interface. A new program is created in response to a user operation of, for example, clicking the [create] button on the program list interface on the program list interface, and a layout type setting interface is entered. As shown in FIG. 10*b*, the layout type setting interface is a modal dialogue box. Various layout patterns such as upper-lower layout, left-right layout, single layout and multiple layout are listed on the layout type setting interface. A layout type of the program is for the screen of the display device playing the program. The layout type includes at least one play region. Specifically, the upper-lower layout refers to that the screen is divided into upper and lower play regions for playing the program, and the upper and lower play regions are equal in size by default. Herein, a shape of the screen is typically a rectangle and, of course, may also be another shape. The left-right layout refers to that the screen is divided into left and right play regions for playing the program, and the left and right play regions are equal in size by default. The single layout refers to that the screen plays the program as one play region, and a size of the play region is a size of the whole screen by default. The multiple layout refers to that the screen is divided into multiple, for example, four, play regions for playing the program, and the four play regions are equal in size by default. Of course, the multiple layout may also refer to that the screen is divided into 6, 8 or another number of play regions. In addition, a thumbnail corresponding to each layout type is displayed on the layout type setting interface. Therefore, the user may clearly determine a play region division condition of each layout type and select a proper type according to a practical requirement. For example, a required layout type is selected in response to a user operation on the layout type setting interface, and a corresponding number of play regions are generated. Then, a program attribute setting interface (referring to FIG. 11) is displayed.

Later on, a position parameter and size parameter of at least one play region are set according to the size of the screen of the display device playing the program. A layout page (referring to FIG. 12) of the program attribute setting interface is displayed in response to a user operation. The layout page includes a screen size setting, a play region position setting and a play region size setting. The screen size setting is required to be set according to the size of the screen of the display device playing the program. For example, of a screen size (width×height) of the LED display screen playing the program is 1,024×768, the screen size setting is correspondingly set to be 1,024×768. The play region position setting is configured to set a position of the play region on the screen. The screen size setting may take a coordinate (0, 0) of the left upper vertex of the screen as a reference point, for example. The position of the play region on the screen is represented by a coordinate, including an abscissa and an ordinate, of the left upper vertex of the play region relative to the reference point. The abscissa is a horizontal distance between the left upper vertex of the play region and the left upper vertex (i.e., the reference point) of the screen (or a distance with a left boundary of the screen). The ordinate is a vertical distance between the left upper vertex of the play region and the left upper vertex of the screen (or a distance with the screen). The play region size setting is configured to set the size of the play region, i.e., a width size and height size (namely width×height) of the play region. Under a normal condition, after the size of the screen is set, the position and size parameters of the play region may adopt default preset values according to the screen size. Of course, the user may modify the position and size parameters of the play region according to a practical requirement. It is to be noted herein that the position parameter and size parameter of the at least one play region may also adopt default values of a program production device or system and thus are not required to be additionally set.

Finally, a playlist is added to the at least one play region and a schedule graph corresponding to the playlist is generated. That is, the at least one play region is scheduled and the corresponding schedule graph is generated. A program setting page (referring to FIG. 11) of the program attribute setting interface is displayed in response to a user operation. The program setting page includes a region selection interface and a schedule timetable interface.

The play region selection interface is positioned on, for example, a left side of the program setting page. The play region selection interface includes at least one graphic region corresponding to the at least one play region. A layout of the graphic region is completely the same as the layout type of the program.

Figure 11:
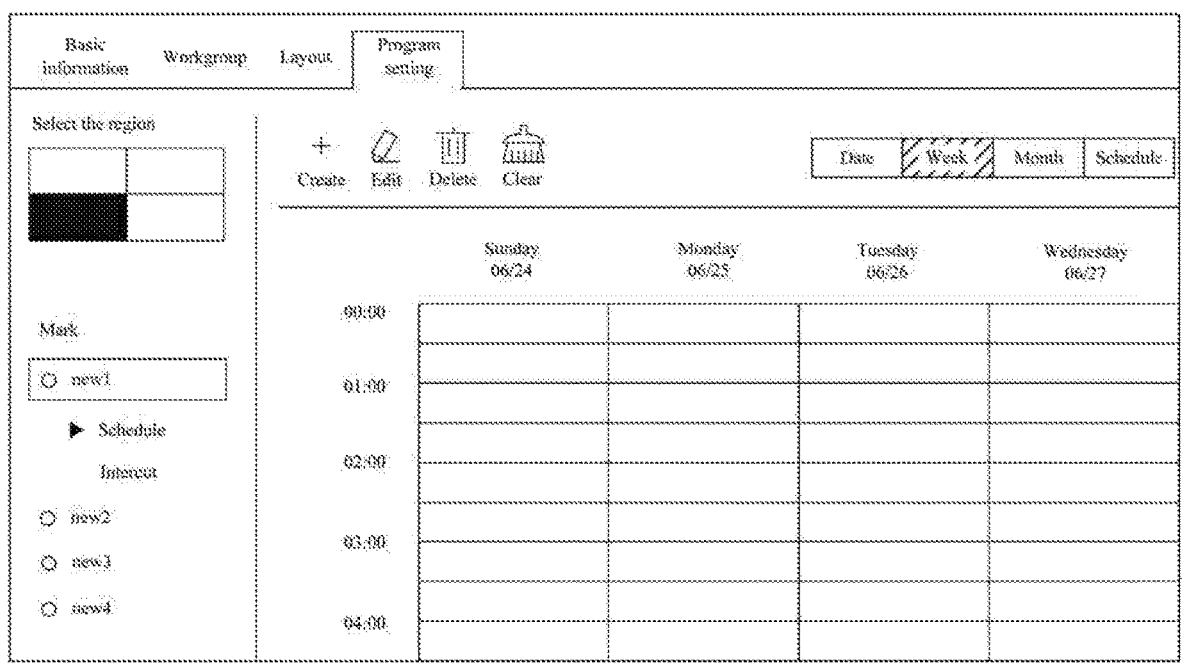
FIG. 11 is a partial setting interface diagram of a program attribute setting interface according to an optional embodiment of the present disclosure.
Figure 13A:
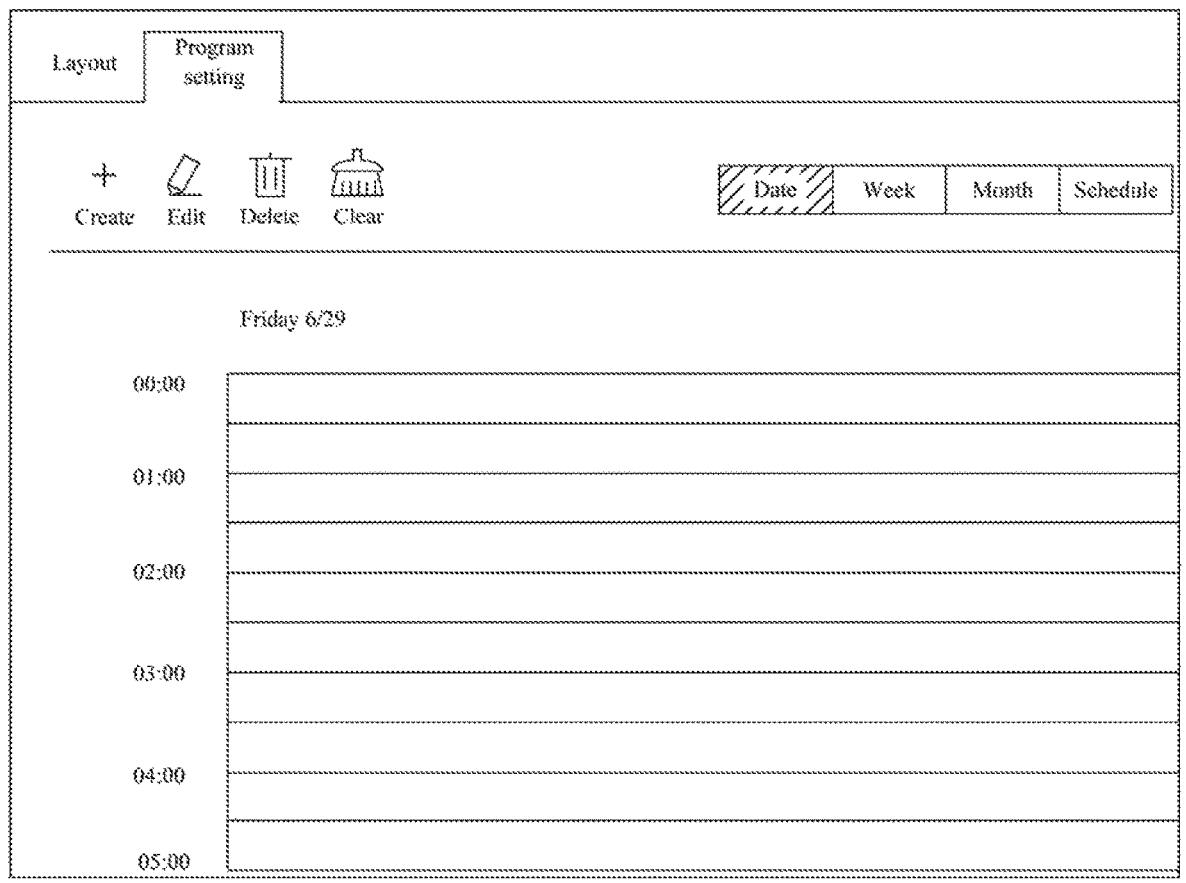
FIG. 13a is a partial setting interface diagram of a daily schedule panel on a schedule timetable interface according to an optional embodiment of the present disclosure.
Figure 13B:
FIG. 13b is a partial setting interface diagram of a weekly schedule panel on a schedule timetable interface according to an optional embodiment of the present disclosure.
Figure 13C:
FIG. 13c is a partial setting interface diagram of a monthly schedule panel on a schedule timetable interface according to an optional embodiment of the present disclosure.
Figure 13D:
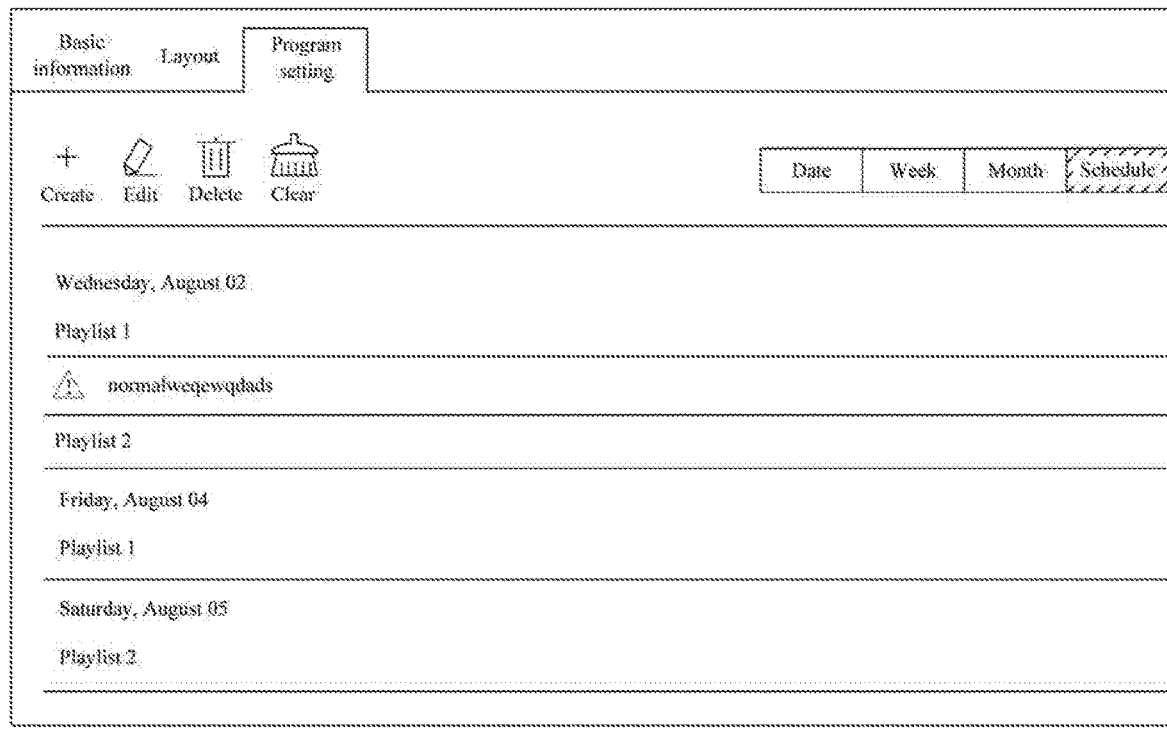
FIG. 13d is a partial setting interface diagram of a schedule panel on a schedule timetable interface according to an optional embodiment of the present disclosure.

As shown in FIG. 11, the schedule timetable interface is positioned on, for example, a right side of the program setting page. Multiple schedule panels are set on the schedule timetable interface, for example, a daily schedule panel (as shown in FIG. 13a), a weekly schedule panel (as shown in FIG. 13b), a monthly schedule panel (as shown in FIG. 13c) and a schedule panel (as shown in FIG. 13d). A longitudinal axis of an interface of the daily schedule panel is 24 hours of a day and takes half an hour as a unit. An abscissa axis takes the same date as a unit. And a program played on the same date represented by the abscissa axis is displayed. A longitudinal axis of an interface of the weekly schedule panel is 24 hours of a day and takes half an hour as a unit. An abscissa axis takes a week as a unit, and a schedule graph of programs played in a present week is displayed. An interface of the monthly schedule panel uses a common calendar representation form for reference to display all programs played in a present month. The schedule panel displays all programs played in a month in a list manner according to a time sequence. Different forms of schedule panels may be switched in response to a button operation executed by the user to view programs played every day, every week and every month. The diversified schedule timetable interface presents a favorable operation interface to the user.

Figure 14:
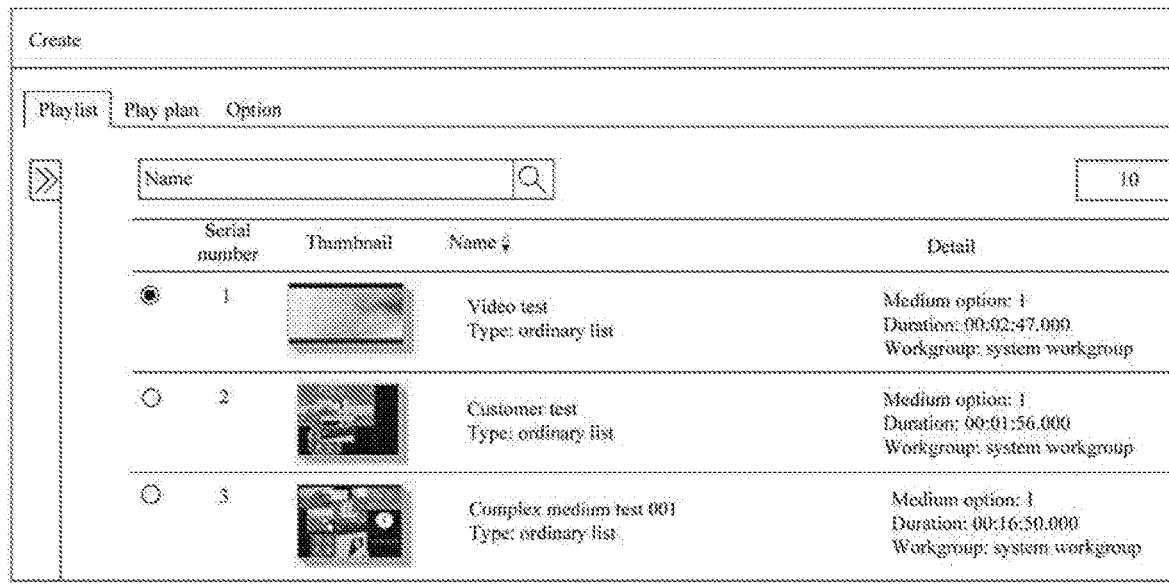
FIG. 14 is a partial setting interface diagram of a playlist list page of a schedule setting interface according to an optional embodiment of the present disclosure.
Figure 20:
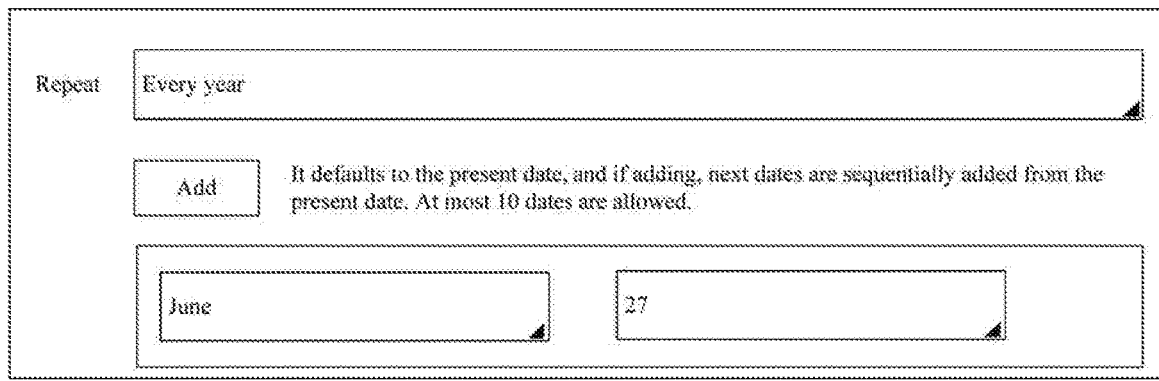
FIG. 20 is a partial interface diagram when a repetition manner is set to be yearly repetition according to an optional embodiment of the present disclosure.

The user may select any graphic region, namely selecting a corresponding play region for scheduling, namely a target playlist is added to the schedule timetable interface. Therefore, the user may set the same or different target playlists for each play region to play the same or different media in different play regions to meet complex and diversified requirements of the user. In addition, after scheduling, the schedule graph corresponding to the play region may further be generated, so that the user may determine about a scheduling condition more intuitively, and a user experience is improved. Specifically, a target graphic region corresponding to the target play region is selected in response to a user operation, and a corresponding schedule panel such as a weekly schedule panel is displayed on the schedule timetable interface. A schedule setting interface for detailed setting of a schedule parameter is displayed on the schedule timetable interface in response to a user operation of, for example, clicking a triggering button such as the [create] button, and it is a playlist list page by default (as shown in FIG. 14). Or, a time or date square on the weekly schedule panel may also be selected, and the triggering button such as the [+] button on the selected time or date square is clicked to display the schedule setting interface. The schedule setting interface is a modal dialogue box and typically includes multiple pages, for example, the playlist list page shown in FIG. 14, a play plan setting page shown in FIG. 15 and an option setting interface shown in FIG. 16. The schedule graph is generated on the schedule panel of the schedule timetable interface through a series of input operations, namely parameter setting of the schedule graph is completed on the schedule timetable interface through a series of input operations. Parameters of the schedule graph include the playlist, a play plan, a graphic attribute and the like.

On the playlist list page shown in FIG. 14, the user may select the playlist corresponding to the present newly created schedule graph. For example, [video test] in FIG. 14 is selected as the playlist corresponding to the present newly created schedule graph. Moreover, as shown in FIG. 14, the playlist list page includes information of a playlist name, a playlist duration, a medium thumbnail, a medium number (corresponding to medium options in a detail bar) and the like. Herein, providing the medium thumbnail is favorable for the user to rapidly find a required playlist.

Figures 15, 16:
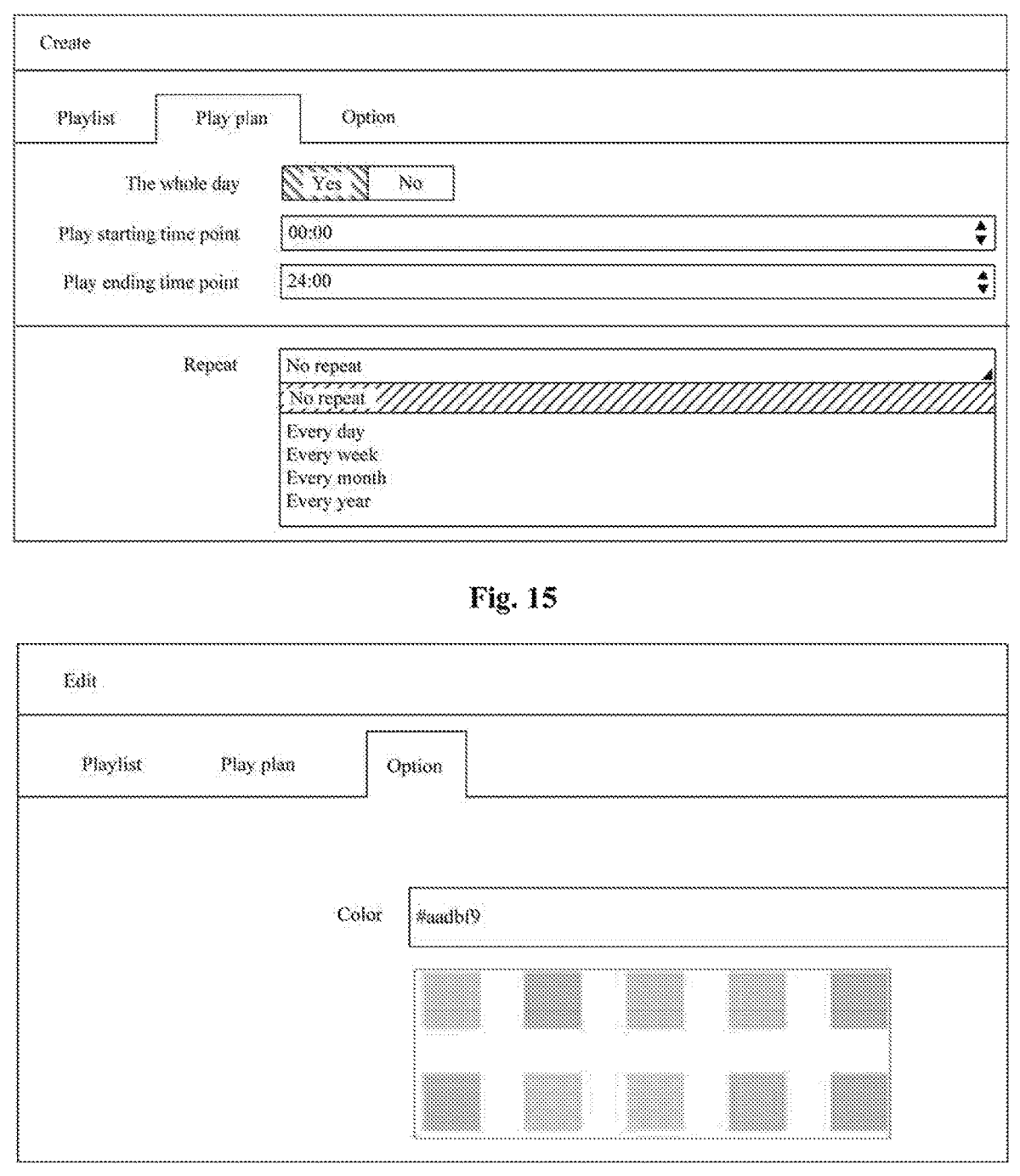

On the play plan setting page shown in FIG. 15, the user may further set at least one of a play starting time setting, play ending time setting and play repetition manner setting in a play plan of the present newly created schedule graph. It is to be noted that play starting time and play ending time of a play plan of a new schedule created in response to a user operation of, for example, clicking the triggering button such as the [create] button are 00:00 to 24:00 of the same day by default (namely the whole day). When a daily schedule interface or a weekly schedule interface is displayed on the schedule timetable interface, play starting time point and play ending time point of a play plan for a new scheduled program created through a triggering button such as the [+] button are a time start and time end corresponding to a time square where the triggering button such as the [+] button is located on the longitudinal axis respectively. When a monthly schedule interface is displayed on the schedule timetable interface, play starting time point and play ending time point of a play plan for a new scheduled program created through the [+] button are 00:00 to 1:00 of the same date where the [+] button is located by default. When a schedule interface is displayed on the schedule timetable interface, a new scheduled program may be created by clicking the [create] button. After the play starting time point and the play ending time point are set, a difference value between the play starting time point and the play ending time point is a play duration of the play plan for the scheduled program. In addition, when it is determined that the play plan corresponding to the present newly created schedule graph is required to be modified, a modification operation may be executed on the corresponding setting on the play plan setting page shown in FIG. 15. Moreover, the repetition manner setting includes options of no repetition, daily repetition, weekly repetition, month repetition, yearly repetition and the like, as shown in FIG. 15. No repetition refers to that the playlist corresponding to the scheduled program is played once. Daily repetition refers to that the program is repeatedly played every day in a range from the play starting time point to the play ending time point (referring to FIG. 17). Weekly repetition refers to that the program may be selected to be repeatedly played in the range from the play starting time point to the play ending time point in at least one day in a week, and the selected dates are highlighted (referring to FIG. 18). Monthly repetition refers to that the program may be set to be repeatedly played in the range from the play starting time point to the play ending time point in at least one day of a month, and the selected dates are highlighted (referring to FIG. 19). Yearly repetition refers to that the program may be set to be repeatedly played in the range from the play starting time point to the play ending time point on a specific date, for example, on June 27 in FIG. 20, of a year (referring to FIG. 20). Multiple repetition manners are set, so that diversified requirements of the user may be met.

On the option setting page shown in FIG. 16, a color of the schedule graph is set. As shown in FIG. 16, the option setting page includes a color setting. Multiple different color options are preset in the color setting for the user to select.

Figure 21:
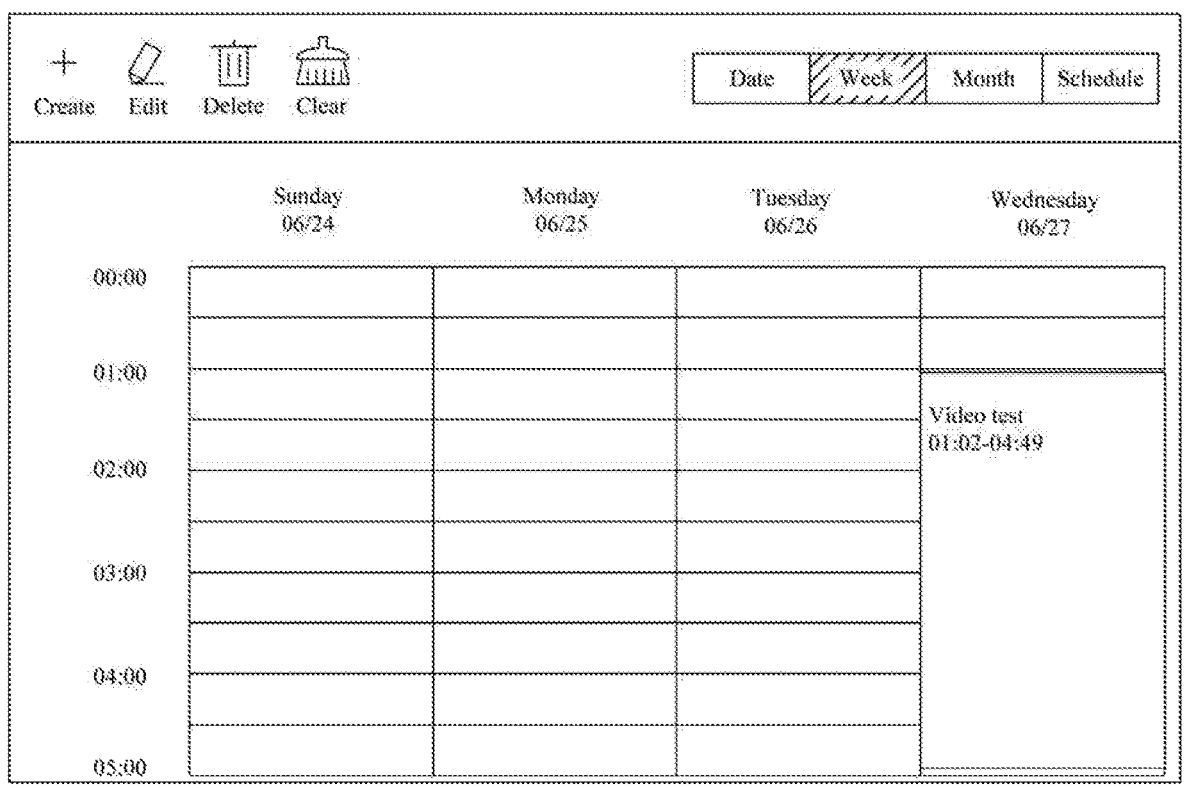
FIG. 21 is a partial effect diagram of generating a schedule graph on a schedule timetable interface according to an optional embodiment of the present disclosure.

From the above, when the [OK] button is clicked on any page shown in FIG. 14, FIG. 15 and FIG. 16, the schedule graph, for example, as shown in FIG. 21 may be generated on the schedule panel such as the monthly schedule panel presently displayed on the schedule timetable interface. The schedule graph is, for example, a rectangular region. A time point corresponding to an upper edge of the schedule graph on a time axis (longitudinal axis) is the play starting time point of the play plan corresponding to the schedule graph. A time point corresponding to a lower edge of the schedule graph on the time axis (longitudinal axis) is the play ending time point of the play plan corresponding to the schedule graph. And the height of the schedule graph intuitively represents the play duration of the play plan corresponding to the schedule graph.

Figure 22:
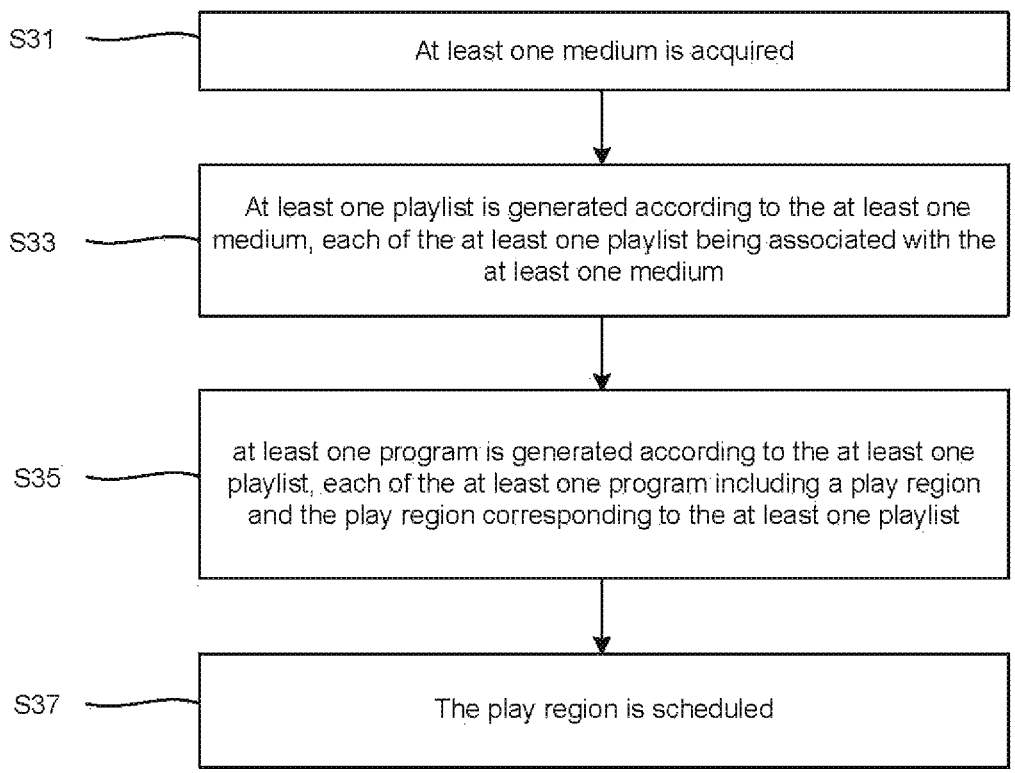
FIG. 22 is a flowchart of a program production method according to another embodiment of the present disclosure.

As shown in FIG. 22, another embodiment of the present disclosure provides a program production method, which includes the following steps.

As step S31, at least one medium is acquired. Herein, the at least one medium may include a new medium added according to step S11 in the abovementioned embodiment and may also include an added medium listed on a medium list interface.

As step S33, at least one playlist is generated according to the at least one medium, each of the at least one playlist being associated with the at least one medium. Herein, the at least one playlist may include a new playlist generated according to step S13 in the abovementioned embodiment and may also include an existing playlist listed on a playlist list interface.

As step S35, at least one program is generated according to the at least one playlist, each of the at least one program including a play region and the play region corresponding to the at least one playlist. Herein, the at least one program may include a new program created according to step S15 in the abovementioned embodiment and may also include an existing program listed on a program list interface. A program of a play region meeting a requirement of a user may be selected, for example, in response to a user operation to obtain the program.

As step S37, the play region is scheduled. The play region is scheduled according to step S19 in the abovementioned embodiment. Furthermore, a schedule graph corresponding to a schedule may be generated. However, multiple schedule graphs may be generated for the same play region, namely the same play region may correspond to at least one playlist. Therefore, after the play region is scheduled to generate a first schedule graph, the program production method provided in the embodiment further includes the following steps.

At first, a second playlist is provided. Herein, the second playlist may be the at least one playlist provided at step S33.

Figure 23:
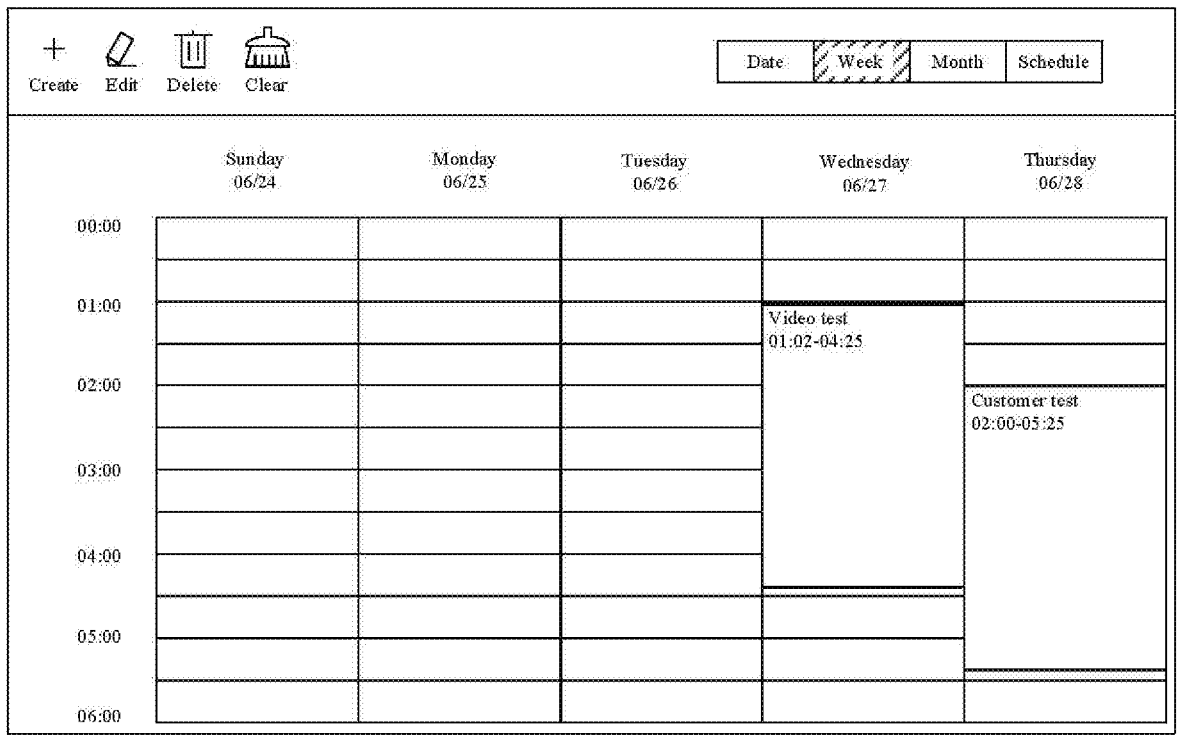
FIG. 23 is a partial schematic diagram of generating two schedule graphs on a schedule timetable interface according to another embodiment of the present disclosure.

Then, the play region is scheduled, namely the second playlist is added, to further generate a second schedule graph. The operation is similar to step S37. Specifically, a target graphic region corresponding to the play region that the first schedule graph is generated for is selected on a program setting page of a program attribute setting interface. A first schedule panel is displayed on a schedule timetable interface. A schedule setting interface (as shown in FIG. 14) for detailed setting of a schedule parameter is displayed on the schedule timetable interface in response to a user operation of, for example, clicking a triggering button such as the [create] button. And the second playlist is selected and added in response to a triggering button clicking operation on a playlist list page of the schedule setting interface to generate the second schedule graph (referring to FIG. 23) corresponding to the second playlist on the first schedule panel.

In addition, the program production method provided in the embodiment further includes the following steps.

Figures 7, 8:
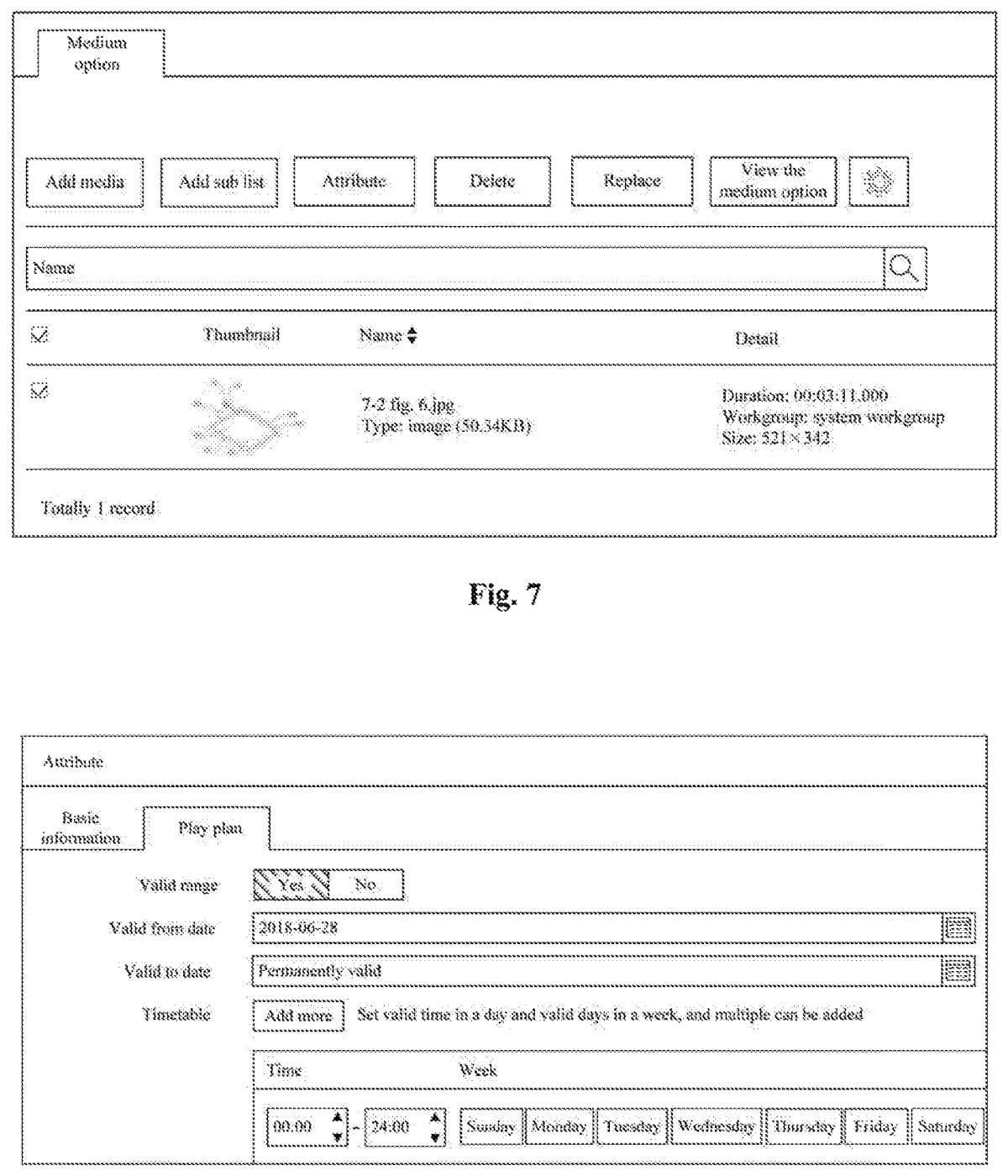

At first, the first playlist is selected on the playlist list interface, and a playlist attribute setting interface is displayed in response to a user operation on the playlist list interface. Specifically, as shown in FIG. 4, the first playlist is selected on the playlist list interface, and the playlist attribute setting interface is displayed in response to the user operation of, for example, clicking the [attribute] button on the playlist list interface. Then, as shown in FIG. 7, a medium to be deleted on a medium option edition page of the playlist attribute setting interface is selected, and the medium to be deleted is deleted from the first playlist in response to a user operation of, for example, clicking the [delete] button on the medium option edition page. In such a manner, when an advertiser is no longer required to play a medium of the advertiser, the user is not required to produce a new program for release and playing and, instead, is required to delete the corresponding medium from an original program, so that influence on playing of other media is avoided, a program production process is simplified, and convenience for operation is ensured.

Moreover, the program production method provided in the embodiment further includes the following steps.

At first, a medium to be added is provided. Herein, the medium to be added may be a medium obtained by step S31.

Then, as shown in FIG. 4, the first playlist is selected on the playlist list interface, and the playlist attribute setting interface is displayed in response to the user operation of, for example, clicking the [attribute] button on the playlist list interface. Finally, as shown in FIG. 7, a medium addition interface (referring to FIG. 6) is displayed in a modal dialogue box form in response to a user operation of, for example, clicking the [add media] button on the medium option edition page of the playlist attribute setting interface, and the medium to be added is selected for association with the first playlist. In addition, a play sequence between the medium to be added and the original medium in the first playlist may further be regulated in response to a user operation, and a specific implementation step refers to the related contents of the abovementioned embodiment. In such a manner, when a new advertiser has a new advertising requirement, the user is not required to produce a new program for release and playing and, instead, is required to add a new medium required to be added into the original program, so that influence on playing of the other media is avoided, the program production process is simplified, and convenience for operation is ensured.

From the above, according to the program production method provided in the embodiments of the present disclosure, a nested hierarchical relationship among a medium, a playlist and a program is established, so that a complex program scheduling scenario may be implemented, for example, different media may be played according to different schedules in different play regions on the screen of the display device, to meet diversified requirements of the user. In addition, in the program produced by the program production method provided in the embodiment, the phenomenon of black frames between multiple media in the valid time range may be avoided, and the user experience is improved. Moreover, when the original advertiser is no longer required to play part of media or a new medium is required to be added for playing, frequently changing new requirements of the advertiser may be met by modification such as deletion or addition according to the original program, flexibility and convenience for operation are ensured, and the problem of producing a completely new program is solved.

Figure 24:
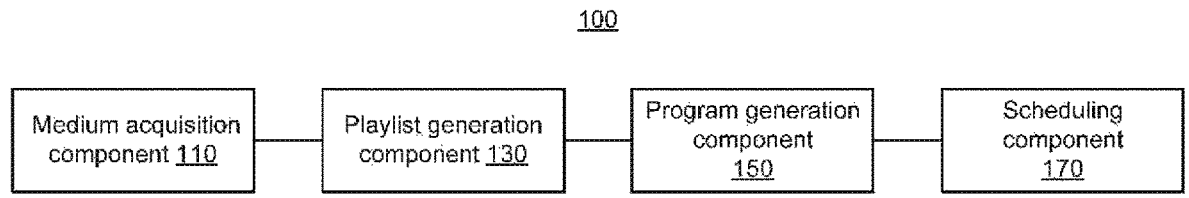
FIG. 24 is a structural schematic diagram of a program production device according to another embodiment of the present disclosure.

As shown in FIG. 24, another embodiment of the present disclosure provides a program device 100. The program device 100 includes:

a medium acquisition component 110, acquiring at least one medium;

a playlist generation component 130, generating at least one playlist according to the at least one medium, each of the at least one playlist being associated with the at least one medium;

a program generation component 150, generating at least one program according to the at least one playlist, each of the at least one program including a play region and the play region corresponding to the at least one playlist; and a scheduling component 170, scheduling the play region.

A specific working process of each component in the program device 100 in the embodiment refers to the abovementioned embodiments.

Figure 25:
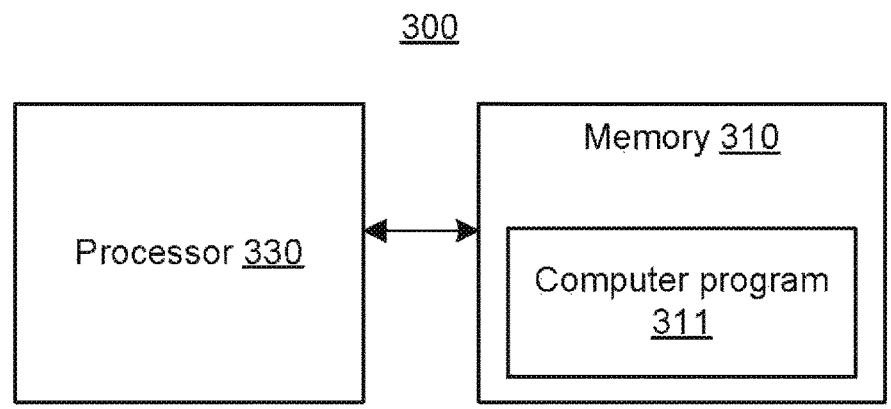
FIG. 25 is a structural schematic diagram of a program production system according to another embodiment of the present disclosure.

As shown in FIG. 25, another embodiment of the present disclosure provides a program production system 300. The program production system 300 includes a memory 310 and a processor 330 connected with the memory 310. The memory 310 may be, for example, a nonvolatile memory, and a computer program 311 is stored therein. The processor 330 may include, for example, an embedded processor. The processor 330 runs the computer program 311 to execute the program production method provided in the abovementioned embodiment.

Figure 26:
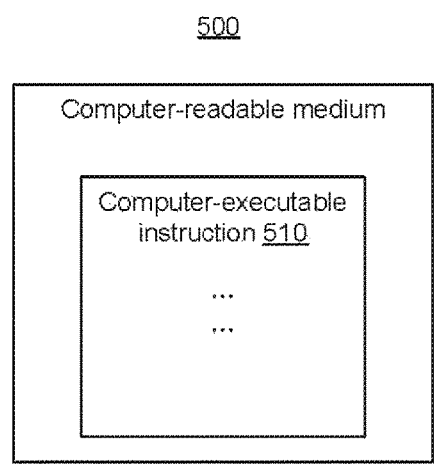
FIG. 26 is a structural schematic diagram of a computer-readable medium according to another embodiment of the present disclosure.

As shown in FIG. 26, another embodiment of the present disclosure provides a computer-readable medium 500 storing a computer-executable instruction 510 for executing the program production method provided in the abovementioned embodiment. The computer-readable medium 500 may include, for example, a magnetic medium (for example, a hard disk, a floppy disk and a magnetic tape), an optical medium (for example, a Compact Disc Read-Only Memory (CD-ROM) and a Digital Video Disk (DVD)), a magneto-optical medium (for example, an optical disk) and a hardware device specially structured to store and execute a computer-executable instruction (for example, a Read-Only Memory (ROM), a Random Access Memory (RAM) and a flash memory). The computer-executable instruction 510 in the computer-readable medium 500 may be executed by at least one processor or processing device.

In the embodiments provided by the present disclosure, it is to be understood that the disclosed system, device and method may be implemented in other manners. For example, the device embodiment described above is schematic. For example, division of the elements is logical function division and another division manner may be adopted during practical implementation. For example, multiple elements or components may be combined or integrated into another system or some characteristics may be neglected or not executed. In addition, coupling, direct coupling or communication connection between the displayed or discussed components may be implemented through indirect coupling or communication connection of some interfaces, devices or elements, and may be in an electrical form or other forms.

The elements described as separate parts may or may not be physically separated, and parts displayed as elements may or may not be physical elements, and namely may be located in the same place, or may also be distributed to multiple network elements. Part or all of the elements may be selected to achieve the purpose of the solutions of the embodiments according to a practical requirement.

It is finally to be noted that the above embodiments are adopted not to limit but to describe the technical solutions of the present disclosure. Although the present disclosure is described with reference to the embodiments in detail, those of ordinary skill in the art should know that the technical solutions recorded in each embodiment may also be modified or part of technical features therein may be equivalently replaced, and the technical solutions corresponding to these modifications or replacements do not depart from the spirit and scope of the technical solutions of each embodiment of the present disclosure.

What is claimed is:

1. A program production method, comprising:
acquiring at least one medium;
generating at least one playlist according to the at least one medium, each of the at least one playlist being associated with the at least one medium;
generating at least one program according to the at least one playlist, each of the at least one program comprising a play region and the play region corresponding to the at least one playlist; and
scheduling the play region;
wherein a position parameter and a size parameter of each of at least one play region are set according to a size of a screen of a display device playing the program;

wherein scheduling the play region comprises:
displaying a program setting page in response to an operation on a program attribute setting interface, wherein the program setting page comprising a play region selection interface and a schedule timetable interface, the play region selection interface comprising at least one graphic region corresponding to the at least one play region;
selecting a target graphic region from the at least one play region;
scheduling a target play region corresponding to the target graphic region in the at least one play region, and adding a target playlist to the schedule timetable interface;
wherein a layout page of the program attribute setting interface comprises a screen size setting, a position setting of the play region, and a size setting of the play region, and the size of the screen of the display device is set by the screen size setting, the position parameter is set by the position setting, and is used to represent a position of the play region on the screen, the size parameter is set by the size setting, and is used to represent a size of the play region on the screen of the display device;
wherein acquiring the at least one medium comprises:
adding the at least one medium to a medium list interface in response to a first button operation on the medium list interface;
selecting the at least one medium, and displaying a medium attribute setting interface in response to a second button operation on the medium list interface; and
setting a valid date of the at least one medium in response to an input operation on a basic information page of the medium attribute setting interface.

2. The program production method as claimed in claim 1, wherein each of the at least one medium comprises a picture, a video, a streaming medium, a Really Simple Syndication (RSS) medium, a web link or a document.

3. The program production method as claimed in claim 1, wherein generating the at least one playlist according to the at least one medium, each of the at least one playlist being associated with at least one medium comprises:
adding the at least one playlist in response to a first button operation on a playlist list interface, and displaying a playlist attribute setting interface; and
selecting the at least one medium in response to a second button operation on a medium option edition page of the playlist attribute setting interface to associate each of the at least one playlist with the at least one medium.

4. The program production method as claimed in claim 3, after selecting the at least one medium in response to the second button operation on the medium option edition page of the playlist attribute setting interface to associate each of the at least one playlist with the at least one medium, further comprising:
selecting a target medium on the medium option edition page, and displaying a medium play attribute setting interface in a modal dialogue box form in response to a third button operation on the medium option edition page; and
setting a play plan for the at least one medium in response to a selection operation on a play plan setting page of the medium play attribute setting interface, the play plan setting page comprising a valid from date setting, a valid to date setting, a valid time range setting and a valid week setting.

5. The program production method as claimed in claim 1, wherein generating the at least one program according to the at least one playlist, each of the at least one program comprising the play region comprises:
adding the at least one program to a program list interface in response to a first button operation on the program list interface, and displaying a layout type setting interface in the modal dialogue box form;
setting a layout type of each of the at least one program in response to a second button operation on the layout type setting interface to generate the play region, and displaying a program attribute setting interface of each of the at least one program; and
setting at least one of a screen size parameter for playing the at least one program and a position parameter and size parameter of the play region in response to a first input operation on a layout page of the program attribute setting interface.

6. The program production method as claimed in claim 5, wherein scheduling a target play region corresponding to the target graphic region in the at least one play region, and adding a target playlist to the schedule timetable interface comprises:
selecting the target graphic region corresponding to the target play region in the play region, and displaying a first schedule panel on the schedule timetable interface;
displaying a schedule setting interface in the modal dialogue box form on the first schedule panel in response to a third button operation on the schedule timetable interface; and
adding a target playlist in the at least one playlist in response to a selection operation on a playlist list page of the schedule setting interface, the playlist list page comprising at least one of a playlist name, a playlist duration, a medium thumbnail and a medium number.

7. The program production method as claimed in claim 6, after adding the target playlist in the at least one playlist in response to the selection operation on the playlist list page of the schedule setting interface, further comprising:
generating a schedule graph corresponding to the target playlist on the first schedule panel;
selecting the schedule graph and displaying a play plan setting page of the schedule setting interface in response to a fourth button operation on the first schedule panel; and
setting a play plan corresponding to the first schedule in response to a second input operation on the play plan setting page of the schedule setting interface, the play plan setting page comprising a play starting time setting, a play ending time setting and a repetition manner setting and the repetition manner setting comprising part or all of options of no repetition, yearly repetition, monthly repetition, weekly repetition and daily repetition.

8. The program production method as claimed in claim 1, further comprising:
selecting a target playlist in the at least one playlist on a playlist list interface, and displaying a playlist attribute setting interface in response to a first button operation on the playlist list interface; and
selecting a target medium in the at least one medium on a medium option edition page of the playlist attribute setting interface, and deleting the target medium in response to a second button operation on the medium option edition page.

9. The program production method as claimed in claim 1, further comprising:
   providing a medium to be added;
   selecting a target playlist in the at least one playlist on a playlist list interface, and displaying a playlist attribute setting interface in response to a first button operation on the playlist list interface; and
   selecting the medium to be added in response to a second button operation on the medium option edition page of the playlist attribute setting interface to associate the medium to be added with the target playlist.

10. A program production device, comprising: a hardware processor coupled with a memory and configured to execute program components stored on the memory, wherein the program components comprise:
   a medium acquisition component, acquiring at least one medium;
   a playlist generation component, generating at least one playlist according to the at least one medium, each of the at least one playlist being associated with the at least one medium;
   a program generation component, generating at least one program according to the at least one playlist, each of the at least one program comprising a play region and the play region corresponding to the at least one playlist; and
   a scheduling component, scheduling the play region;
   wherein a position parameter and a size parameter of each of at least one play region are set according to a size of a screen of a display device playing the program;
   wherein the scheduling component is configured to schedule the play region by the following steps:
   displaying a program setting page in response to an operation on a program attribute setting interface, wherein the program setting page comprising a play region selection interface and a schedule timetable interface, the play region selection interface comprising at least one graphic region corresponding to the at least one play region;
   selecting a target graphic region from the at least one play region;
   scheduling a target play region corresponding to the target graphic region in the at least one play region, and adding a target playlist to the schedule timetable interface;
   wherein a layout page of the program attribute setting interface comprises a screen size setting, a position setting of the play region, and a size setting of the play region, and the size of the screen of the display device is set by the screen size setting, the position parameter is set by the position setting, and is used to represent a position of the play region on the screen, the size parameter is set by the size setting, and is used to represent a size of the play region on the screen of the display device;
   wherein acquiring the at least one medium comprises:
   adding the at least one medium to a medium list interface in response to a first button operation on the medium list interface;
   selecting the at least one medium, and displaying a medium attribute setting interface in response to a second button operation on the medium list interface; and
   setting a valid date of the at least one medium in response to an input operation on a basic information page of the medium attribute setting interface.

11. The program production device as claimed in claim 10, wherein the playlist generation component generates the at least one playlist according to the at least one medium by:
   adding the at least one playlist in response to a first button operation on a playlist list interface, and displaying a playlist attribute setting interface; and
   selecting the at least one medium in response to a second button operation on a medium option edition page of the playlist attribute setting interface to associate each of the at least one playlist with the at least one medium.

12. A program production system, comprising a memory and a processor, wherein the memory stores a computer program, and the processor runs the computer program to execute the program production method as claimed in claim 1.

13. A non-transitory computer-readable medium containing computer instructions stored therein for causing a computer processor to perform the program production method as claimed in claim 1.

* * * * *